Figure 1:
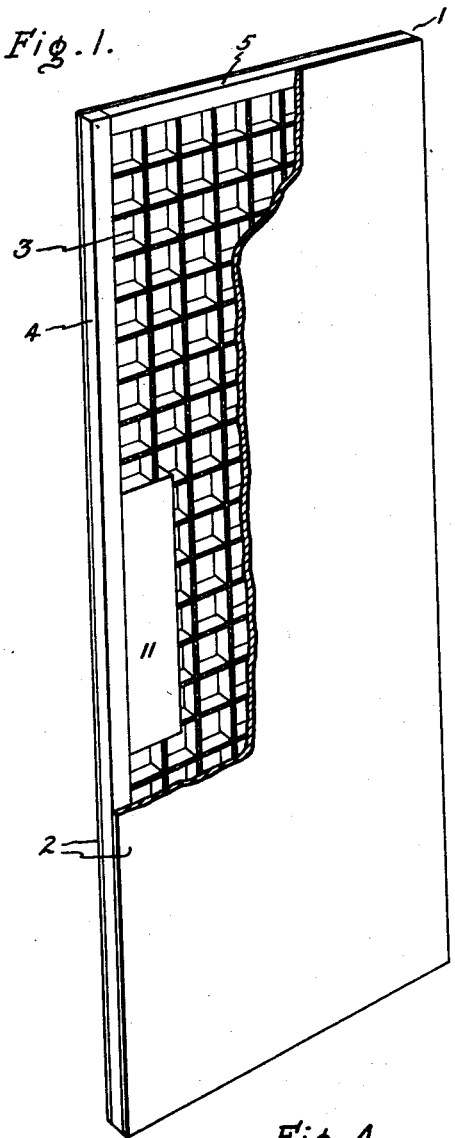

June 13, 1950     MacM. CLEMENTS     2,511,620
STRUCTURAL PANEL
Filed April 16, 1948

Inventor
MacMillan Clements,
by Gilbert P. Tarleton
His Attorney.

Patented June 13, 1950

2,511,620

UNITED STATES PATENT OFFICE 2,511,620

STRUCTURAL PANEL

MacMillan Clements, Southport, Conn.

Application April 16, 1948, Serial No. 21,480

2 Claims. (Cl. 20—91)

This invention relates to structural panels and more particularly to improvements in such panels which are suitable for use as doors.

Heretofore, certain panels which have been used as doors have consisted of a rectangular frame which is closed front and back with relatively thin sheets of facing material and within which is a core or spacer. The core, which is either solid or hollow, is composed of structural or semi-structural material of comparatively high density and low compressibility. The strength of such panels is derived mainly from the strength in both tension and compression of the facing sheets in directions parallel with their surfaces. Such panels are, therefore, sometimes called stress skin panels.

In order to utilize the tensile strength of the facing sheets to the fullest advantage it is important that there be a continuous and uniform bond between their margins and the frame and also that the facing sheets remain flat and neither have a bulge or a depression in their surfaces. The core or spacer has a controlling effect on both of these factors. Thus, if it is too thick it makes it difficult if not impossible to secure a uniform continuous bond between the sides of the frame and the margins of the facing sheets, and it distorts the plane of the facing sheets outwardly. If it is too thin the facing sheets will have an inward depression, and it will be impossible to bond them uniformly to the core. Furthermore, if the core is not dimensionally stable under varying temperature and humidity conditions the plane of the facing sheets will also be distorted. The nature of the core also largely determines the weight, thermal insulation and acoustical properties of the panel.

In accordance with this invention a hollow core consisting of a slightly oversize grid of comparatively low density and substantial compressibility stable material is used. The preferred material is corrugated board (such as paper) of two hundred and seventy-five pound test. The comparative inertness of this material eliminates the distortion of the panels due to core movement resulting from expansion and contraction. The compressibility of the grid insures continuous uniform contact between the sides of the frame and the margins of the facing sheets while at the same time maintains the facing sheets flat and in contact with the core. Also, the hollow grid construction is light and, by breaking up convection currents of air, provides, in combination with the low thermal conductivity of the material, a substantial measure of thermal insulation. It also has substantial sound deadening properties.

An object of the invention is to provide a structural panel of the hollow flush door variety which is light, stable and inexpensive.

Another object of the invention is to provide a hollow structural panel having a core spacer of low density and high compressibility compared with previously used spacers.

A further object of the invention is to materially increase the strength of hollow non-metallic structural panels.

An additional object of the invention is to provide a new and improved method of making a structural panel.

The invention will be better understood from the following description taken in connection with the accompanying drawing, and its scope will be pointed out in the appended claims.

Figure 2:
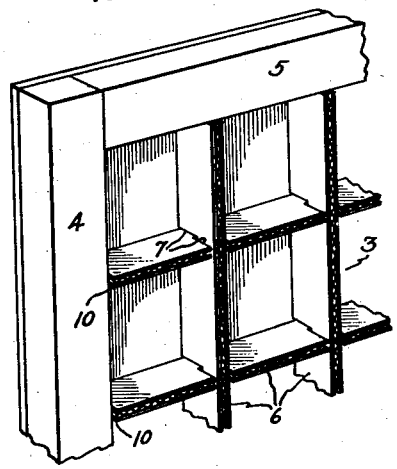
Figure 3:
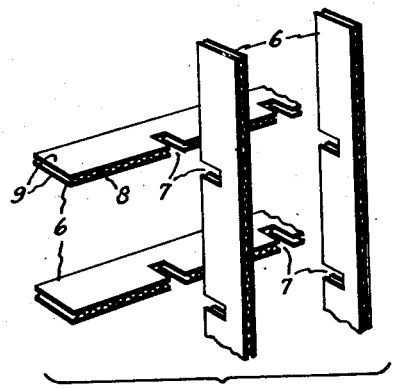
Figure 4:
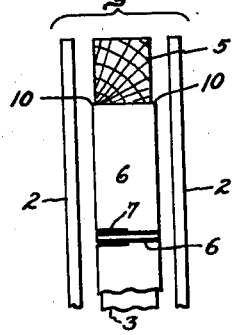

In the drawing, Fig. 1 is a partly broken away perspective view of an embodiment of the invention, Fig. 2 is an enlarged detail view of a corner of the structure showing in Fig. 1, Fig. 3 is an enlarged exploded detail view of the core grid and Fig. 4 is a side elevation of the panel shown in Fig. 1 before the front and back facing sheets are applied.

Referring now to the drawing, and more particularly to Fig. 1, there is shown therein a door panel consisting of a rectangular frame 1, front and back facing sheets 2 and a core 3. The frame comprises two rails or side pieces 4 (only one of which is visible) and two stiles or end pieces 5 (only one of which is visible) which may be made of any suitable material such as clear pine. The facing sheets 2 may also be made of any suitable material such as quarter inch thick tempered hardboard, two ply veneer, three ply plywood, sheet metal or laminated sheet metal and plywood or the like. The frame may be an inch and a quarter thick which with the two quarter inch thick facing sheets will result in a one and three quarter inch thick door panel.

The core 3 which is shown more clearly in Fig. 2 is a grid of slotted corrugated board strips 6. Suitable dimensions of the grid cells are three inches by three inches. The slots 7 in the strips are made slightly wider than the thickness of the strips so as to provide restricted passage-ways for ventilation and pressure equilization within the panel.

The strips 6 which are shown more clearly in Fig. 3 may consist of a central corrugated paper member 8 covered on both sides with jute or kraft paper, the whole being glued together.

The strips 6 are cut slightly wider than the frame 1 so as to have projections 10 as shown in Figs. 2 and 4 which extend beyond the sides of the frame before the facing sheets 2 are applied.

For receiving a lock, a solid wood block 11 is glued or otherwise fastened to the inside of one of the rails 4 symmetrical with its center so that the door can be hung either end up with the hardware located the same distance from the floor.

In assembling the panel the edges of the core grid 3 and the sides of the frame 1 are coated with casein or other water resistant glue along all of the surfaces which are to contact the facing sheets, the grid is pressed into the frame, and the facing sheets are placed on opposite sides of the frame and the edges squared up. The whole assembly is then subjected to pressure between flat plates in a suitable press (not shown) so as to compress the core enough to cause continuous uniform contact and bonding between the parts.

While there has been shown and described a particular embodiment of the invention it will be obvious that changes and modifications can be made without departing from the invention, and, therefore, it is aimed in the appended claims to cover all such changes and modifications as fall within the true spirit and scope of the invention.

What I claim as new and desire to secure by Letters Patent of the United States is:

1. A structural panel comprising, in combination, a rectangular frame of relatively incompressible material, a compressible fiber grid core inside said frame, said core consisting of a central corrugated paper member provided with cover members of paper having high tensile strength, said core being thicker than said frame, and front and back facing sheets glued to the four sides of said frame and to said core grid, with said sheets flat and said core under compression.

2. A hollow door construction comprising, in combination, a rectangular wooden frame having two end members and two side members, a solid wood block for receiving a door latch and lock fastened to the inside of one side member symmetrically with respect to the middle thereof, a core inside said frame comprising a multi-cell grid of notched interfitting corrugated fiberboard members, each of said members comprising a central corrugated paper member and paper covering members on both sides of said corrugated paper covering members, said covering members being of high tensile strength, said core being compressible and being thicker than said frame, and rectangular front and back facing sheets glued to the edges of said core grid and to the end and side members of said frame throughout their length with said core grid compressed so that said sheets are flat.

MACMILLAN CLEMENTS.

REFERENCES CITED

The following references are of record in the file of this patent:

UNITED STATES PATENTS

| Number | Name | Date |
|---|---|---|
| 2,288,104 | Pasquier | June 30, 1942 |

FOREIGN PATENTS

| Number | Country | Date |
|---|---|---|
| 501,714 | Great Britain | Mar. 3, 1938 |